M. F. LANGWORTHY.
COMBINED IVING AND STEERING AXLE FOR MOTOR DRIVEN VEHICLES.
APPLICATION FILED AUG. 16, 1919.
1,373,393.
Patented Mar. 29, 1921.
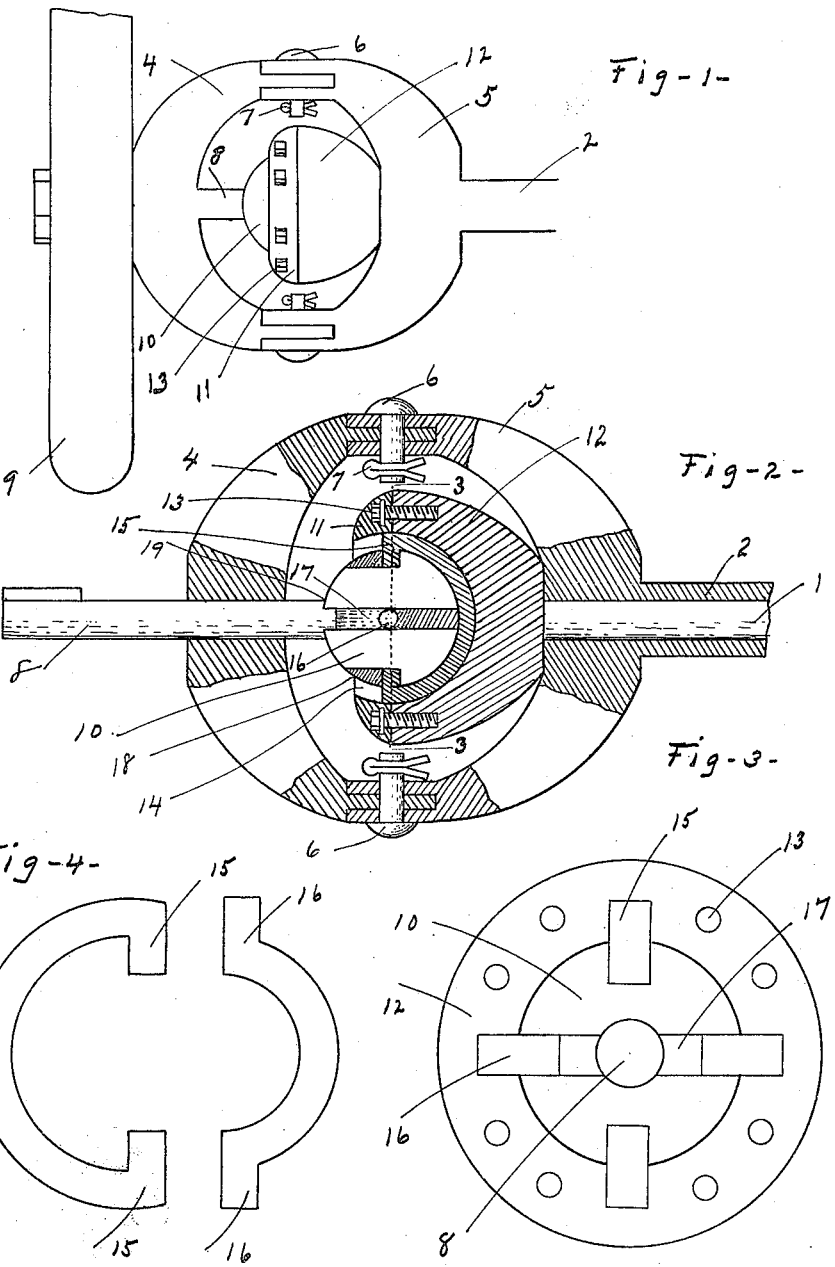

UNITED STATES PATENT OFFICE.

MARTIN F. LANGWORTHY, OF DETROIT, MICHIGAN.

COMBINED DRIVING AND STEERING AXLE FOR MOTOR-DRIVEN VEHICLES.

1,373,393. Specification of Letters Patent. Patented Mar. 29, 1921.

Application filed August 16, 1919. Serial No. 318,067.

*To all whom it may concern:*

Be it known that I, MARTIN F. LANGWORTHY, a citizen of the United States, residing at Detroit, in the county of Wayne and State of Michigan, have invented certain useful and new Improvements in Combined Driving and Steering Axles for Motor-Driven Vehicles; and I do hereby declare the following to be a full, clear, and an exact description of the invention.

This invention relates to motor driven vehicles, and more particularly to that class in which the front or steering wheels are operatively connected to the driving mechanism so that four wheel traction is permitted, and the primary object of the invention is a provision of a particular construction of the connection between the wheel carrying stub axle, and the driving axle, whereby the front wheels may be both driven and steered.

With the foregoing and other objects in view this invention consists in such novel features of construction, combination and arrangements of parts as will be hereinafter more fully described, illustrated in the accompanying drawing, and claimed.

In describing the invention in detail reference will be had to the accompanying drawing wherein like characters designate like and corresponding parts throughout, and in which:

Figure 1 is a front elevation of the combined driving and steering knuckle joint showing same applied to a fragment of a motor vehicle.

Fig. 2 is a longitudinal vertical section certain parts being shown in elevation.

Fig. 3 is a section on line 3—3 of Fig. 2.

Fig. 4 is a front elevation of the driving pins shown connected by semi-circular yokes.

Referring more particularly to the drawing, 1 designates the front driving axle which is inclosed in the casing 2 of any ordinary motor vehicle, which is pivotally connected through the medium of arms 5 and bolts 6 to arms 4 of the wheel carrying stub axle casing. Bolts 6 are held to place by pins 7. The stub axle 8 which carries the wheel 9 has its inner end secured to a ball or sphere 10 which is rotatably supported by a casing composed of two sections 11 and 12, section 12 being a spherical socket and section 11 being provided with a conically reduced opening through which the stub axle 8 extends. Bolts 13 connect the two sections 11 and 12. The sections 11 and 12 are provided with grooves 14 through which extends transversely through the sections and aline with each other forming a guideway for pins 15 which are detachably connected to and carried by the ball 10. A groove 17 in the ball 10 extending transversely around the ball and at right angles to the groove 14 in the casing 11—12 acts as a guideway for pins 16 which are detachably connected to and carried by the casing.

The guideway 17 in the ball 10 and the guideway 14 in the casing 11—12 will permit the pins 15 to take various positions necessary to a universal movement, the pins 16 always remaining in place in the casing 11—12. The members 15 are in a diametrical plane of the ball 10 diametrically opposite and permit the ball 10 to rotate upon them as an axis within the casing 11—12 at the same time they are permitted to operate in the groove 14 of the casing. Similarly the members 16 which are connected by a semi-circular yoke are in a diametrical plane of the ball, diametrically opposite, and permit the ball 10 to rotate upon them as an axis at the same time permitting them to operate within the groove 17 of the ball 10. The angle of universal movement is limited only by the casing at point 18 coming in contact with the stub axle at point 19. Section 11 can be made any convenient depth without materially reducing the power of the pins to drive at an angle for the pins 15 by being connected in the manner as shown in the illustration can move freely in and out of the casing at the same time maintaining their driving power. As pins 16 are always in place in their cylindrical shaped sockets in the casing 11—12 their power to drive is the same at an angle as it is in a straight line. Thus the pins 15 and 16 maintain a practically constant driving force even at the widest angle obtainable in turning a motor vehicle which angle is limited only in the above described manner.

As arms 5 and 4 and the axle casing 2 of the driving axle 1 and the casing of the stub axle 8 carry the load, the pins 15 and 16 only serve the purpose of driving while the guideways 14 and 17 permit the steering of the motor vehicle. Thus no weight of the load is borne by the driving pins.

The ball 10 is permitted a rotary movement by the guideways 14 and 17 so as to permit of the steering of the motor vehicle wheels 9. The driving axle is operatively connected to the base of the spherical socket section 12 of the casing 11—12, preventing endwise movement of the axle in relation to the casing 2.

The pins 15 and 16 striking the walls of the guideways 14 and 17 will cause the ball 10, consequently the wheel carrying stub axle 8 which is connected thereto to rotate in the same direction as the rotation of the driving axle 1 for transmitting power from the axle 1 to the stub axle 8 and the guideways 14 and 17 will permit of the steering movement of the stub axles 8 and the wheels carried thereby.

In reducing the invention to practice, minor features of construction, combination and arrangements of parts may necessitate alterations to which the patentee is entitled provided such alterations are comprehended within the scope of what is claimed.

What is claimed is:

In a universal joint connecting adjacent axle ends, a socket carried by one axle end and having a groove therein in a plane of the axle, a ball carried by the other axle end and having a groove in its surface in a plane of the axle, normally at right angles to the plane of the groove in the socket, a semi-circular yoke slidable in the groove of the socket and having inwardly directed pins at its ends extending into recesses in the ball, and a second semi-circular yoke slidable in the groove of the ball and having outwardly directed pins at its ends extending into recesses in the socket.

In testimony whereof I affix my signature in the presence of two witnesses.

MARTIN F. LANGWORTHY.

Witnesses:
HARRISON A. PARKER,
LENA RUSSELL.